June 22, 1943.  N. M. NESSET ET AL  2,322,701
PREPARATION OF STERILE TUBING SETS
Filed Aug. 20, 1941
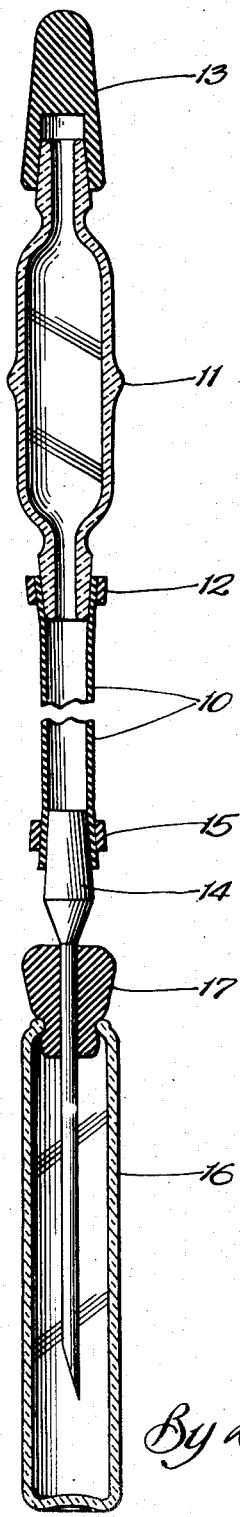
Inventors:
Naurice M. Nesset
and Edward J. Nawoj,
By Dawson, Ooms & Booth
Attorneys.

Patented June 22, 1943

2,322,701

UNITED STATES PATENT OFFICE 2,322,701

PREPARATION OF STERILE TUBING SETS

Naurice M. Nesset, Glenview, and Edward J. Nawoj, Chicago, Ill., assignors to Baxter Laboratories, Inc., Glenview, Ill., a corporation of Delaware Application August 20, 1941, Serial No. 407,612

6 Claims. (Cl. 21—2)

This invention relates to sterile tubing sets. It is particularly useful in parenteral therapy.

It is the common hospital practice to give bulk parenteral therapy by means of recipient sets consisting of necessary glass or metal parts connected by means of relatively heavy walled rubber tubing. Furthermore, it is the hospital practice to re-use these recipient sets and it is obvious that incident to this practice that the recipient sets be cleansed after or before each dispensation. This practice introduces a hazard to this therapy, principally by virtue of the fact that it is relatively difficult to clean the rubber tubing. It is also a relatively expensive procedure to clean the rubber tubing as compared to cleaning the glass or metal parts.

An object of this invention is to provide a new means and method for obviating the hazard and labor incident to cleaning the rubber tubing, as above referred to, without increasing the cost. A further object is to provide a sterile tubing, equipped with fittings, which is ready for use without cleaning, whereby the cost is considerably reduced. Other objects and advantages will appear as the specification proceeds.

The invention may be used with a variety of different types of apparatus. For the purpose of illustration, there is shown in the accompanying drawing one form of apparatus with which the invention may be employed, the single figure setting forth a plan view of tubing and fittings which may be employed in the practice of the invention.

In the illustration given, 10 indicates a thin-walled rubber tubing which tends to collapse under atmospheric pressure, particularly upon the removal of a portion of the air within the same. The tubing may be formed not only of rubber, but also of any other suitable material. By way of illustration, we have found that rubber tubing with a wall thickness of eleven-thousandths of an inch (.011") is satisfactory. It will be understood, however, that the wall dimensions may vary with the particular rubber or other material employed. It is sufficient for the purposes of the invention that the wall structure be such as to collapse under pressure in the neighborhood of atmospheric.

In use, the tubing 10 is equipped with fittings at one or both ends. The fittings will vary widely. In the illustration given, the connector fitting 11 is shown secured to one end of the rubber tubing. In view of the fact that thin-walled rubber tubing has an extremely low tensile strength, it is necessary to reinforce the open end by means of a rubber band 12 placed over the rubber tubing after the fitting is in place. To seal the outer end of the fitting 11, a resilient cap 13 is employed.

In the illustration given, the opposite end of the tubing 10 is equipped with a hollow needle member 14, which is likewise secured to the tubing by means of a rubber band 15. To seal the hollow needle, it is passed into a vial 16 and through a resilient plug 17, closing the vial.

Instead of using the rubber bands 15, it will be understood that the ends of the rubber tubing may be reinforced to provide integral means for frictionally-engaging and sealing the ends of the fittings.

The assembled set, with the fittings open, is then thoroughly rinsed and filled with distilled water of satisfactory purity or other suitable liquids, such as a physiological solution of sodium chloride, etc. When the set has been filled with a suitable liquid, the set is hermetically sealed by placing a rubber tip 13 over the open end of the fitting 11 and inserting the hollow needle through the rubber sealing plug 17 into the vial, the vial having been previously filled with the same form of liquid, such as distilled water, saline solution, or other suitable liquid.

It will be understood that a variety of glass or metal fittings may be attached to the tubing, and for the sealing thereof, the same or equivalent means may be employed.

The set after thus being filled and closed is then heated to sterilize the same. If desired, the sterilization may be acccomplished by wrapping the tubing set within gauze, canvas, or other suitable supporting material, and placing the same within an autoclave. The heat is carefully controlled to sterilize the tubing while at the same time maintaining the liquid inside of the tubing in liquid phase. If desired, the tubing may be placed within a sealed container and sterilized therein by autoclaving.

In use after autoclaving, one end of the set is opened, allowing the fluid to run out and thus collapsing the tubing, after which the usual procedure of parenteral therapy is followed.

The advantages of autoclaving the tubing completely filled with a suitable solution, may be stated as follows:

1. It keeps the tubing distended, thereby preventing adherence of the walls during autoclaving.

2. It prevents oxidation and discoloration.

3. It enables checking of the set for leaks prior to the administration or use.

4. It permits starting the parenteral infusion without removing air from the set.

5. It enables the use of simple gauze or canvas wrappings, thereby eliminating the cost of the container, reducing labor involved in preparing the set, and providing the maximum economy in packing and storage space.

While we have described the parts as consisting of rubber, glass, metal, etc., it will be understood that equivalent materials may be employed, and it will be further understood that variations may be made in the steps and details recited by those skilled in the art without departing from the spirit of our invention.

We claim:

1. A method of preparing sterile tubing, comprising filling thin-walled tubing collapsible under atmospheric pressure with a sterile liquid, sealing the ends, supporting the same, and sterilizing with heat.

2. A method of preparing sterile tubing, comprising filling thin-walled tubing collapsible under atmospheric pressure with liquid, sealing the ends, wrapping the same within supporting material, and sterilizing with heat.

3. A method of preparing a sterile tubing set, comprising filling, with liquid, a thin-walled tubing collapsible under atmospheric pressure and equipped at its ends with fittings, sealing the fittings, and sterilizing the set with heat while maintaining the liquid in liquid phase.

4. A method of preparing sterile tubing, comprising filling, with liquid, thin-walled tubing collapsible under atmospheric pressure, provided at one end with a connector fitting and at the other end with a hollow needle, sealing the connector fitting, sealing the needle by inserting the same through the resilient closure of a vial, the vial being filled with liquid, and sterilizing the set with heat.

5. A method of preparing sterile tubing, comprising filling, with liquid, thin-walled tubing collapsible under atmospheric pressure, the tubing being equipped at its ends with fittings, means sealing the fittings, supporting the set within wrapping material, and sterilizing with heat.

6. A method of preparing sterile tubing, comprising filling thin-walled tubing collapsible under atmospheric pressure with liquid, sealing the ends of the tubing, introducing the same into a container, sealing the container, and heating the container to sterilize the contents.

NAURICE M. NESSET.
EDWARD J. NAWOJ.